(12) United States Patent
Pape

(10) Patent No.: US 12,096,727 B2
(45) Date of Patent: Sep. 24, 2024

(54) HYBRID AEROPONIC/HYDROPONIC GROWING SYSTEM

(71) Applicant: Aerosource IP, LLC, Marion, IL (US)

(72) Inventor: Nathaniel Pape, Marion, IL (US)

(73) Assignee: Aerosource IP, LLC, Marion, IL (US)

( * ) Notice: Subject to any disclaimer, the term of this patent is extended or adjusted under 35 U.S.C. 154(b) by 110 days.

(21) Appl. No.: 16/792,443

(22) Filed: Feb. 17, 2020

(65) Prior Publication Data
US 2021/0251163 A1 Aug. 19, 2021

(51) Int. Cl.
*A01G 31/02* (2006.01)
*A01G 2/10* (2018.01)

(52) U.S. Cl.
CPC .............. *A01G 31/02* (2013.01); *A01G 2/10* (2018.02)

(58) Field of Classification Search
CPC ........ A01G 31/02; A01G 31/06; A01G 31/00; A01G 2031/006; A01G 9/02
See application file for complete search history.

(56) References Cited

U.S. PATENT DOCUMENTS

| | | | | |
|---|---|---|---|---|
| 4,813,176 A | * | 3/1989 | Takayasu | A01G 31/02 47/62 R |
| 4,976,064 A | * | 12/1990 | Julien | A01G 31/02 239/545 |
| 5,394,647 A | * | 3/1995 | Blackford, Jr. | A01G 31/02 47/62 A |
| 8,516,742 B1 | * | 8/2013 | Azoulay | A01G 2/00 47/62 A |
| 2005/0011118 A1 | * | 1/2005 | Umbaugh | A01G 31/02 47/61 |
| 2005/0274073 A1 | * | 12/2005 | Brooke | A01G 31/02 47/59 R |
| 2008/0276534 A1 | * | 11/2008 | Bissonnette | A01G 27/003 47/62 R |
| 2012/0085026 A1 | * | 4/2012 | Morris | A01G 31/06 47/62 A |
| 2013/0019527 A1 | * | 1/2013 | Howe-Sylvain | A01G 31/06 47/62 A |
| 2015/0282444 A1 | * | 10/2015 | Butler | A01G 31/02 47/62 C |
| 2015/0289463 A1 | * | 10/2015 | Moriarty | A01G 27/001 47/62 R |
| 2016/0227719 A1 | * | 8/2016 | Orff | A01G 31/02 |

(Continued)

*Primary Examiner* — Joshua D Huson
*Assistant Examiner* — Spencer T Callaway
(74) *Attorney, Agent, or Firm* — Fishman Stewart PLLC

(57) ABSTRACT

A hybrid plant growing system that supports aeroponic and hydroponic/deep-water cultures is based upon an elongated growing table configured to receive a plurality of reconfigurable panels with openings for cuttings, clones, or larger plants in net cups or pots. A spray manifold includes a plurality of spray heads under sufficient pressure to mist the root portions of the growing plants. Removable and replaceable baffle plates enable the system to support aeroponic plant culture with the baffle plates in position, as well as a hydroponic or deep-water plant culture, wherein the roots of the plants are allowed or encouraged to invade into the nutrient solution. End-wall ports enable a plurality of the tables to be serially cascaded and share a common reservoir. At least two sizes are provided, including longer tables having a length of about 8 feet, and shorter tables having a length of about 4 feet.

22 Claims, 7 Drawing Sheets

(56) References Cited

U.S. PATENT DOCUMENTS

| | | | |
|---|---|---|---|
| 2017/0064910 A1* | 3/2017 | Newton | A01G 9/028 |
| 2017/0071143 A1* | 3/2017 | Newsam | A01G 9/246 |
| 2017/0105368 A1* | 4/2017 | Mehrman | A01G 31/06 |
| 2017/0172084 A1* | 6/2017 | Fox | A01G 24/00 |
| 2017/0347548 A1* | 12/2017 | Jollie | A01G 31/02 |
| 2018/0325055 A1* | 11/2018 | Krakover | A01G 31/06 |
| 2018/0343812 A1* | 12/2018 | Leo | A01G 9/249 |
| 2019/0069497 A1* | 3/2019 | Broutin Farah | A01G 9/006 |
| 2019/0246584 A1* | 8/2019 | Hsueh | G01N 33/0098 |
| 2019/0321779 A1* | 10/2019 | Ristvey | A01G 31/00 |
| 2020/0008375 A1* | 1/2020 | Rubanenko | A01G 31/06 |
| 2021/0007305 A1* | 1/2021 | Adams | A01G 9/02 |
| 2021/0007307 A1* | 1/2021 | Adams | A01G 9/02 |

\* cited by examiner

HYBRID AEROPONIC/HYDROPONIC GROWING SYSTEM

FIELD OF THE INVENTION

This invention relates generally to advanced plant culture and, in particular, to a modular system and related methods that combine aeroponic and hydroponic growing techniques.

BACKGROUND OF THE INVENTION

Considerable research and investment is being devoted to growing plants without soil as the traditional growing medium, with the two most promising techniques being hydroponic and aeroponic culture. The differences involve the ways in which water and nutrients are applied to the roots of the plants. With respect to the leafy portions above the roots, the processes may be the same, and may include natural or artificial light or a combination thereof.

In hydroponic systems, the roots are effectively submerged in nutrient-containing water, with or without a growing medium. With aeroponics, the roots are exposed in a humid or fog-like environment, wherein continuous or timed misting with a nutrient solution keeps the roots from drying out.

One difference between the two approaches involves the ways in which the plants are supported. Hydroponic systems typically use a chemically inert growing medium that maintains the plants in position while a consistent flow of moisture and nutrients are delivered. In aeroponic systems, the plants are secured with the exposed roots hanging down. Various techniques may be used to support the plants during growth, including clips or perforated panels. The roots may be contained in a 'basket' to minimize tangling.

Hydroponic systems may be further divided into deep water, nutrient film, wick and drip systems. In deep-water systems, plant roots are fully submerged, and care must be taken to ensure plants do not 'drown' without proper oxygenation. With nutrient film techniques, the roots are not entirely submerged, but are instead situated just above a slanted growing channel, with run-off flowing into a reservoir for reuse. In a wick system, plants are located in a growing medium above the nutrient solution, with an absorbent wick being used to carry the nutrient solution up to the growing medium. In a drip system, plants are placed in growing medium are fed through a drip line. Run off can either be recycled or discarded.

In a typical aeroponic set-up, plants are suspended above water/nutrient reservoir. A water pump forces the solution through nozzles that direct a fine mist to the exposed, suspended roots. The pump may be submersed in the reservoir, or located remotely. The nutrient solution may also be delivered as a vapor (i.e., "fogponic" culture). Water run-off naturally drips back into the reservoir. The combination of the dissolved nutrients in water, sunlight or artificial light, $CO_2$, and oxygen are sufficient to keep plants healthy as long as the roots are hydrated.

Aeroponic growing systems typically incorporate two primary components: the reservoir, where the water supply is stored and monitored for quality and nutrient levels, and a planter bed where the plants are actually grown. Planter bed designs vary, but most include the misting system, a drainage system, and a structure for supporting and separating the roots from the plant. Pumps are typically also used to continuously exchange the water in the reservoir.

Aeroponic growing systems must be operated continuously or nearly so, as roots without moisture will soon start dying out. As such, power outages, broken pumps, clogged nozzles, and empty reservoirs must be avoided. Systems must be in place to alert the grower of such failures so that such issues can be addressed on a timely basis.

One advantage of aeroponics is that the plant roots are full contact with oxygen at all times. Also, since the dissolved nutrients are being directly applied to the roots, the nutrients are readily available for plant uptake. Aeroponics also allows plants to be placed closer together, and the lack of soil expedites harvesting. Aeroponics uses a very limited amount of water, as the water not used by the plants is naturally recycled. One advantage of hydroponic systems is that plants can survive longer in the event of a malfunction since the roots are submerged.

SUMMARY OF THE INVENTION

This invention resides in a hybrid plant growing system that supports aeroponic and hydroponic or deep-water cultures. The system is based upon an elongated growing table, and wherein at least the lower portion of the table is sealed against sidewalls and end walls, thereby forming a water-tight interior to maintain a reservoir of nutrient solution. The upper portion of the table is configured to receive a plurality of removable and reconfigurable panels, at least including perforated panels to support a growing plant having a leafy portion disposed above the panel and a root portion disposed below the panel.

A spray manifold, configured for longitudinal placement along a central region of the interior of the table, includes an inlet adapted to receive pressurized nutrient solution and an outlet facilitating connection to a spray manifold in an adjoining table, if present. The spray manifold further includes an upper surface with a plurality of apertures configured to receive spray heads oriented toward the root portions of the growing plants.

One or more removable and replaceable baffle plates are supported in the interior of the table, enabling the system to support aeroponic plant culture with the baffle plates in position, thereby minimizing root intrusion into the nutrient solution, and a hydroponic or deep-water plant culture, wherein the roots of the plants are allowed or encouraged to invade into the nutrient solution.

A pair of ports, each being associated with a respective one of the end walls of the table, and wherein the ports enable a plurality of the tables to be serially cascaded and share a common reservoir. In preferred embodiments, the length of the growing table is in the range of 3 to 10 feet. More preferably, at least two sizes are provided, including longer tables having a length of 8 feet, more or less, and shorter tables having a length of 4 feet, more or less.

In accordance with a preferred embodiment, the upper portion of each table is configured to receive three elongated rows of removable and reconfigurable panels, including a middle row with non-perforated panels and two outside rows with perforated panels. The table may include openings to receive conduits to and from a chiller to cool the nutrient solution, solution sensors, and so forth. Many or all of the operation and maintenance functions associated with the table or table array may be computer automated.

DETAILED DESCRIPTION OF THE PREFERRED EMBODIMENTS

Figure 1:
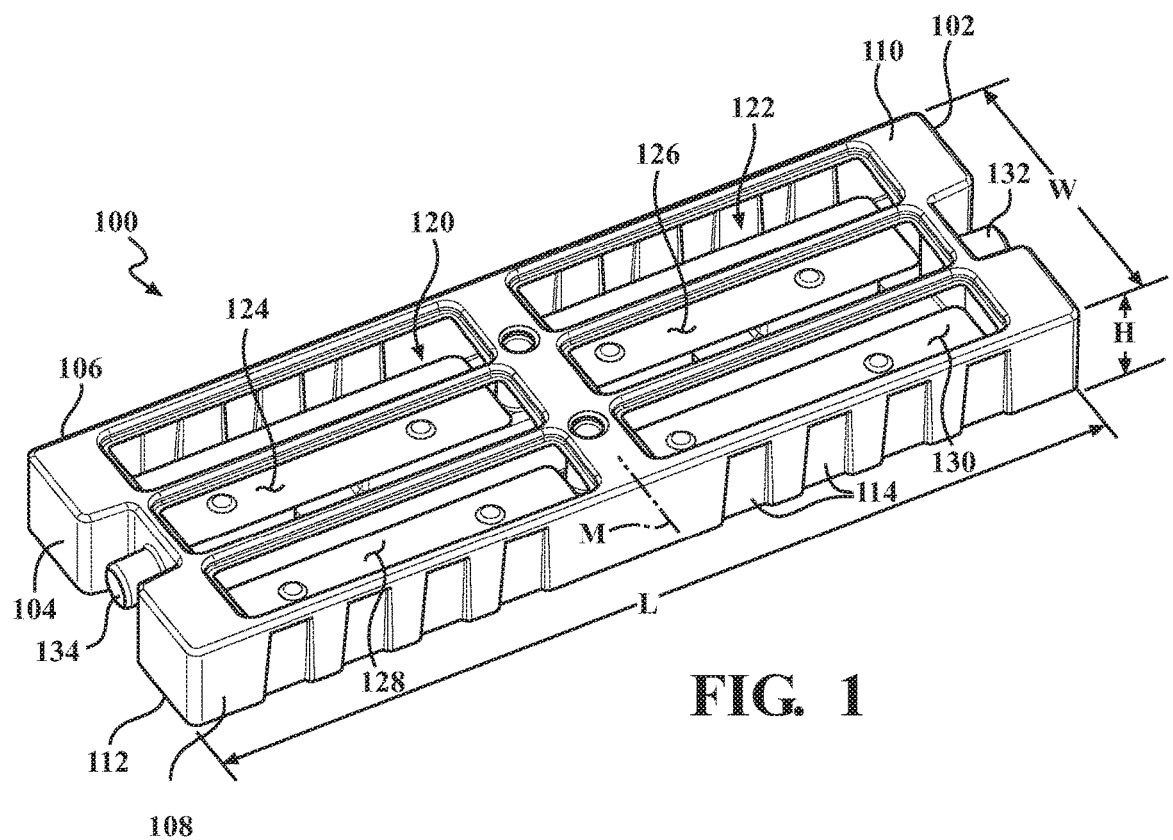
FIG. 1 is a perspective view of a preferred embodiment of the invention without insert panels.

Now making reference to the accompanying drawing, FIG. 1 is a perspective view of a preferred grow table or 100 constructed in accordance with the invention. The article 100 defines a water-tight tray including end surfaces 102, 104 defining a length, L; side surfaces 106, 108 defining a width, W; and top and bottom surfaces 110, 112 defining a height, H. Optional structures, such as indents 114 in the side surfaces 108 may be provided for rigidity.

The grow table of FIG. 1 features six elongated openings 120, 122, 124, 126, 128, 130, each configured to receive various panels described below. The ends 102, 104 of the table 100 include end ports 132, 134 to facilitate cascading of multiple tables, also discussed below. The table itself 100, as well as the panels, are constructed of a rigid or at least semi-rigid plastic base material such as ABS, preferably rotationally molded as a composite including ultraviolet fiber or inhibitors to facilitate use in direct sunlight with minimal degradation. The material is preferably opaque and light grey in color, and the various inserts are designed to prevent light from entering into the interior of each table to prevent the growth of algae and other unwanted The particular embodiment of FIG. 1 has a length, L, of about 8 feet, a width, W, of about 30 inches, and a height, H, of about 10 inches, with the understanding that the invention is not limited to these values or proportions. Different dimensions are possible, and indeed, smaller units may be provided by dividing the table in half lengthwise, for a length of about 4 feet, and three elongated openings as opposed to six. In all embodiments, end ports 132, 134 are provided to receive end connectors as described below for table-to-table cascading.

Figure 2:
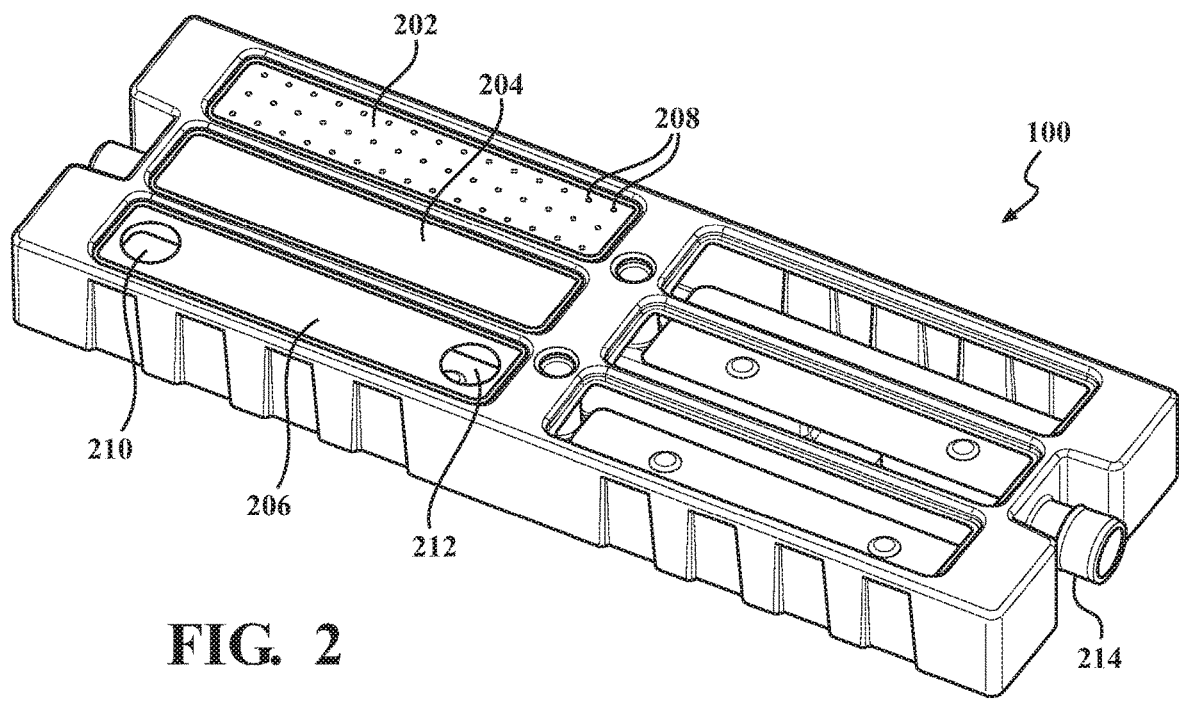
FIG. 2 is a perspective view of the preferred embodiment with removable panels installed.

FIG. 2 is a perspective view of the table 100 of FIG. 1 showing three possible insert panels 202, 204, 206. Panel 202 includes an array of smaller apertures 208, on the order of ¼" in diameter, adapted to receive cuttings or clones. Panel 204 is a blank that may be used in any position to seal off an opening. Panel 206 includes a plurality of larger openings 210, 212 to receive larger plants. Specifically, openings 210, 212 may be adapted to receive net baskets (i.e., 5" net cups) to accommodate the root structures of larger plants.

Although two openings are shown, each with a diameter in the range of 3-5 inches, the size, shape and number of the openings may be varied depending upon the type or age of the plant being cultivated. FIG. 2 also shows one length of connector tube 214 facilitating cascading of multiple tables. Tube 214, preferably a flexible hose, may actually be of any length. Hose clamps may be used for water-tight connections.

Figure 3:
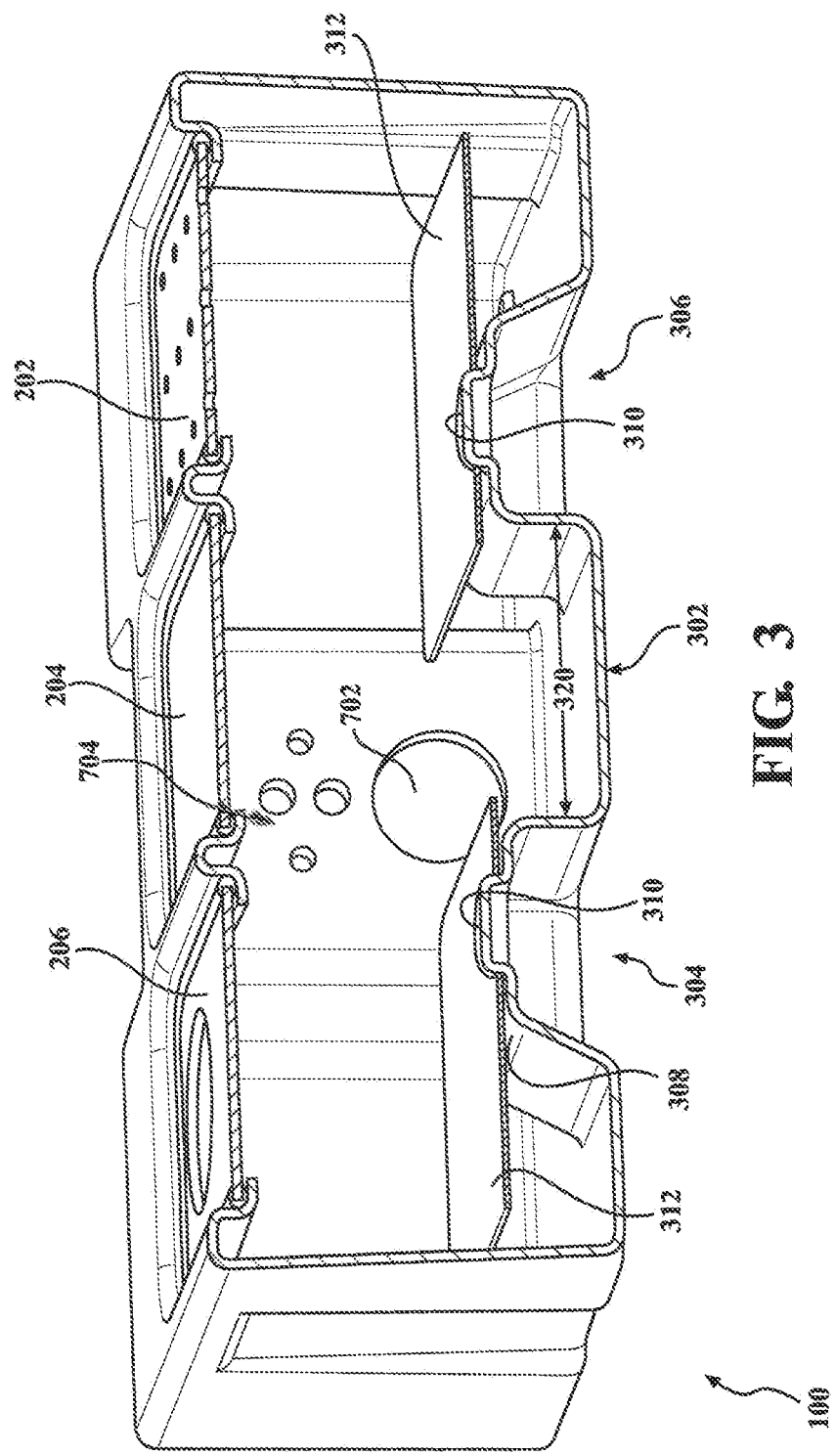
FIG. 3 is a cross-sectional view showing one end of a grow table.

FIG. 3 is a cross-sectional view showing one end of a grow table 100. The bottom panel 302 of each tray preferably includes a plurality of molded indents 304, 306, each further including flat surfaces 308 with raised projections 310. The molded projections are adapted to receive panels 312 that rest on the flat surfaces, including holes configured to fit over the raised projections 310, thereby maintain the panels 312 in position as shown. While not evident from FIG. 3, the panels 312 are intended to run lengthwise on both sides within each tray.

The panels 312 serve the important function of enabling the apparatus to function for aeroponic culture, hydroponic culture, or a combination of the two. In particular, assuming the level of the reservoir is slightly below the bottom surface of panels 312, aeroponic culture is achieved, with spray misters (described below) being responsible for hydrating the bare roots of the growing plants. If, however, the roots naturally extend or are allowed to extend below panels 312 and into the nutrient reservoir, hydrponic/deep-water culture is facilitated. Indeed, panels 312 may be removed to encourage root invasion into the liquid reservoir. Recess 320 is configured to accommodate a spray manifold described below.

Figure 4:
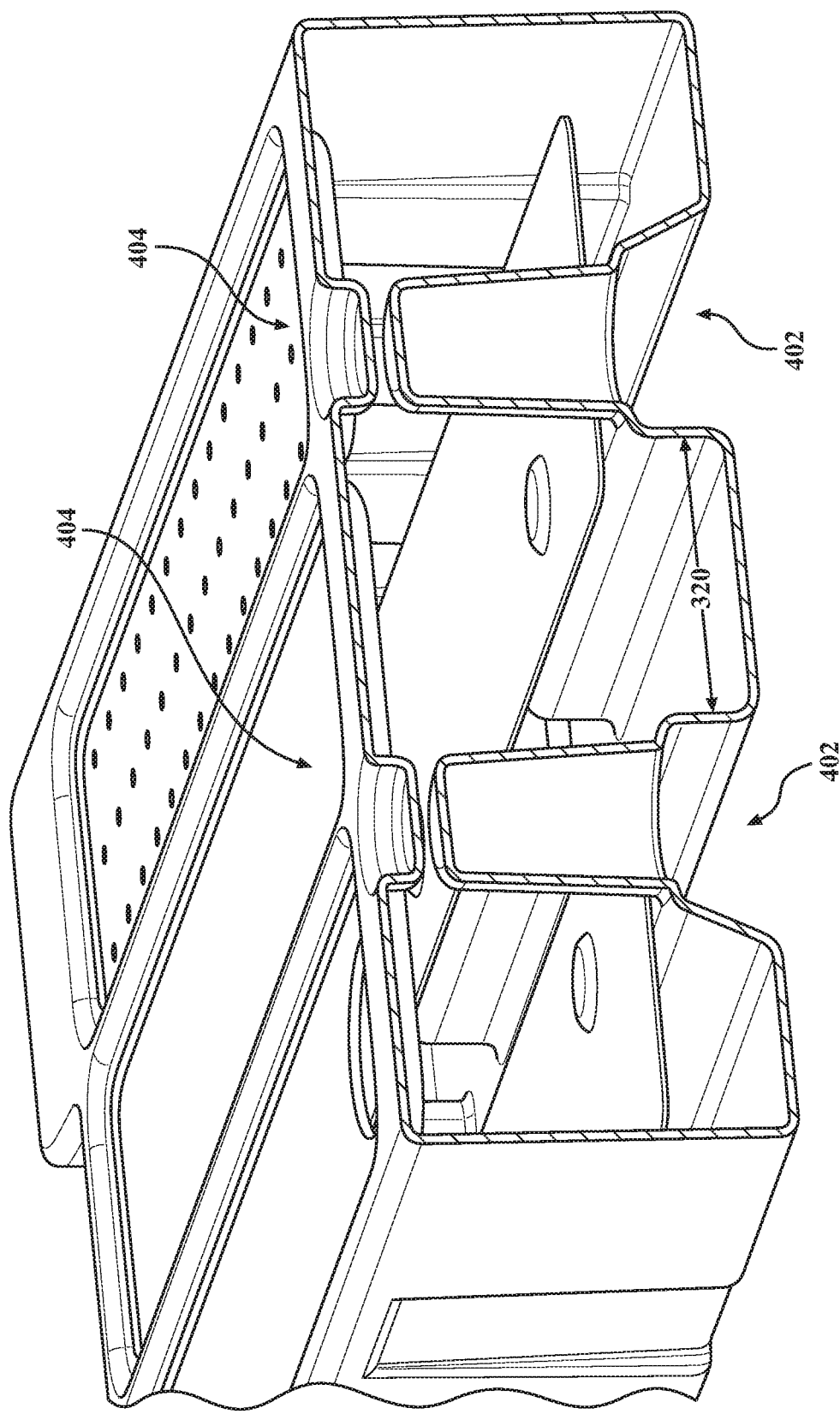
FIG. 4 is a different cross section of a grow table.

FIG. 4 is a cross section of a tray taken along the midpoint "M" depicted in FIG. 1. The cross section of FIG. 4 illustrates the use of upward structures 402 aligned with dimples 404 in the upper panel 110 of the tray. These structures enable vertical tray stacking for shipping or storage, for example, while preventing breakable or deformation due to excessive weight between the upper and lower surfaces of the trays.

Figure 5:
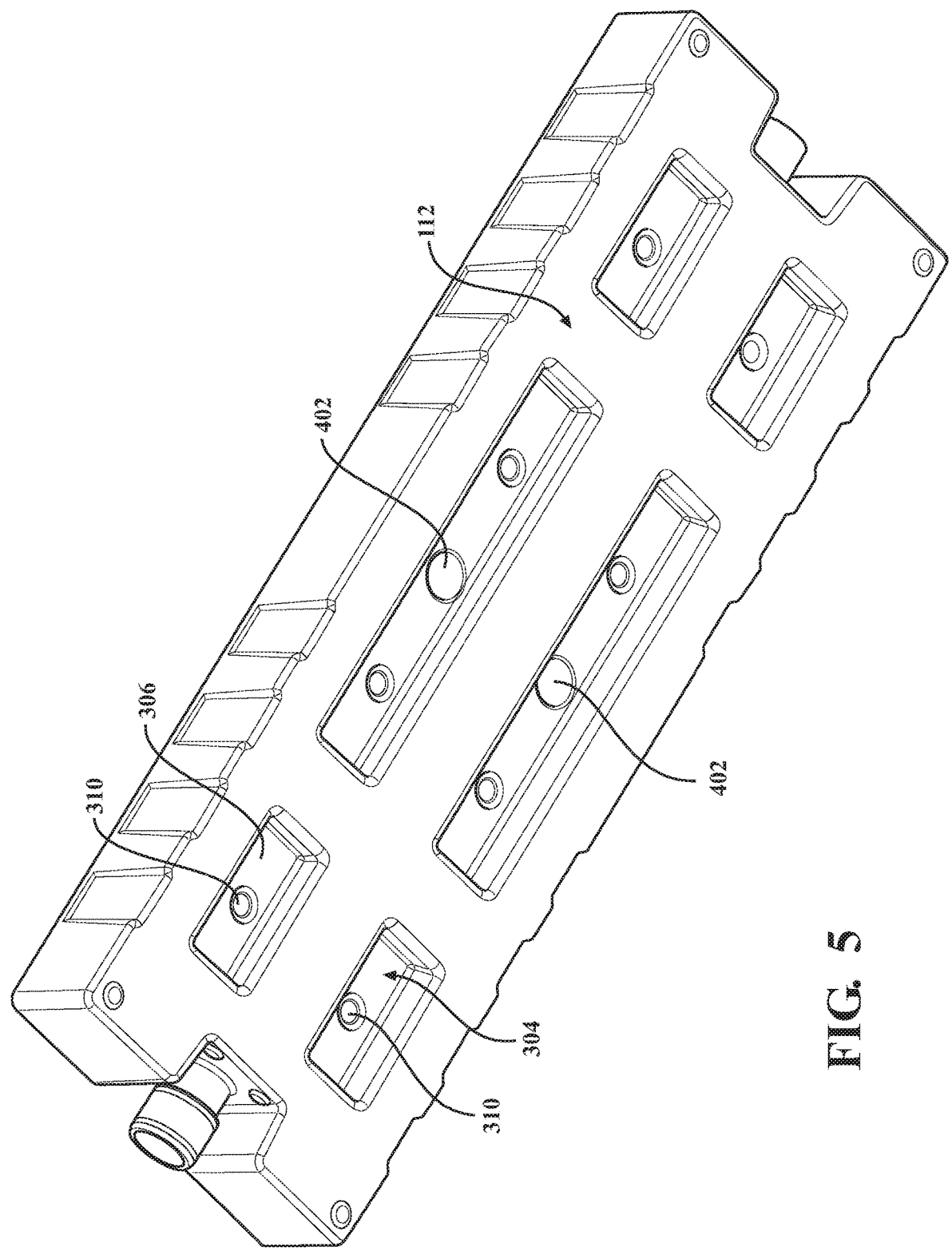
FIG. 5 is a bottom, perspective view of a grow table.
Figure 6:
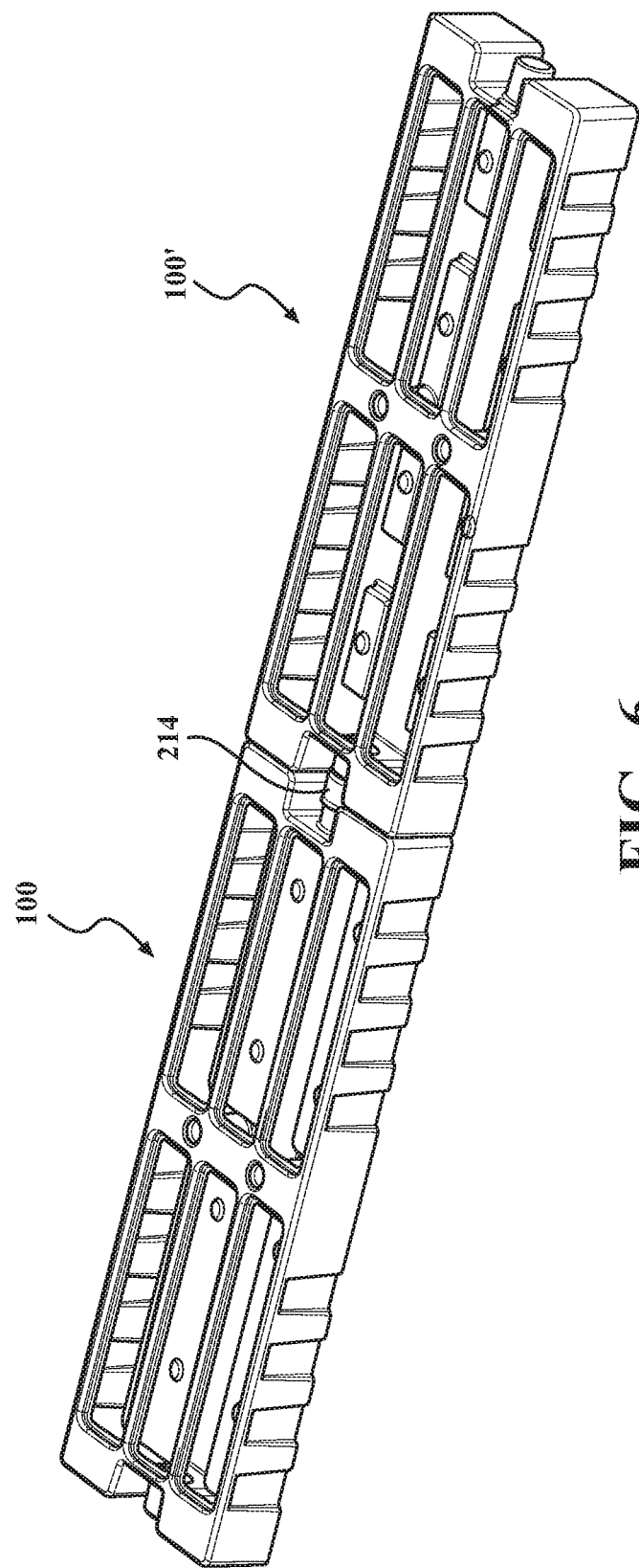
FIG. 6 is a perspective view illustrating the way in which grow tables may be cascaded, particularly for commercial installations.

FIG. 5 is a perspective, bottom view of a tray, showing the relationship between the various structures. FIG. 6 illustrates the cascading of two trays, 100, 100', interconnected with a short length of tubing 214 shown in FIG. 2. If the tubing 214 is sufficiently short, multiple trays may physically abut one another, as shown.

Figure 7:
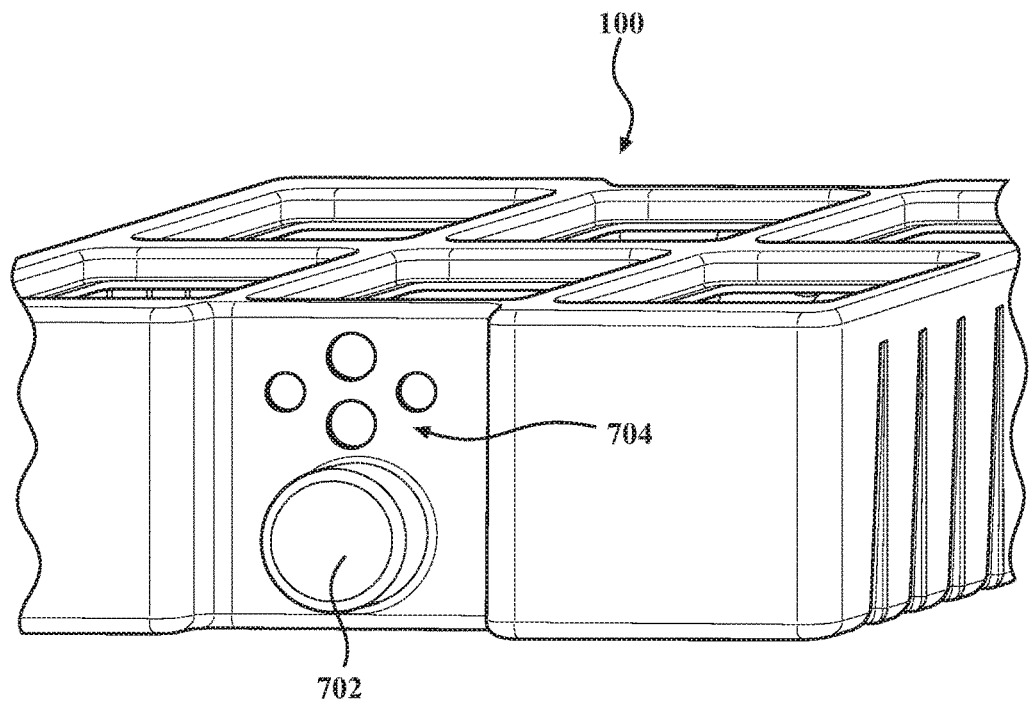
FIG. 7 is an end view of a try showing ports for reservoir transfer and misting.
Figure 8:
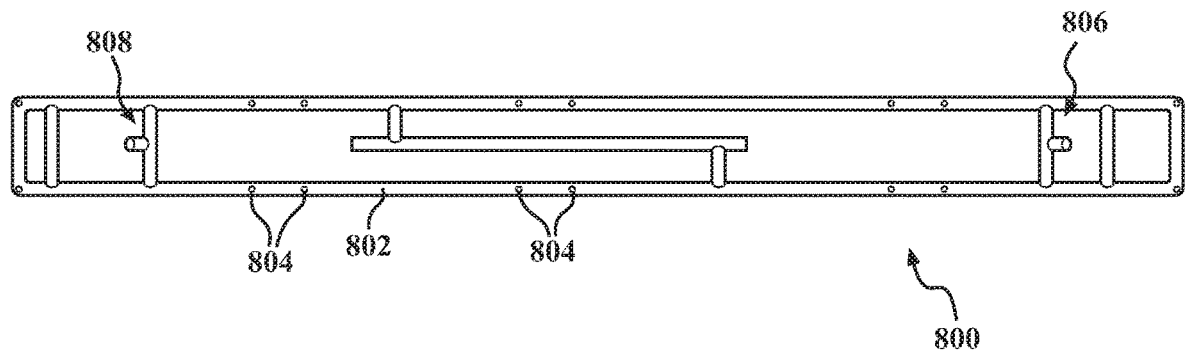
FIG. 8 depicts a spray head manifold.

FIG. 7 is an end view of a tray 100 showing a primary port 702 used for cascading the reservoirs of multiple trays. In the preferred embodiments, port 702 has a 4" diameter. An arrangement of smaller ports 704 are used to make connection to plumbing components explained in further detail with respect to FIG. 9. One such component is the spray head distribution manifold 800 depicted in FIG. 8. This elongated structure is configured to drop into the central internal recess of each tray, this recess being labeled 320 in FIGS. 3, 4. The manifold 800, which may be fabricated from PVC tubing 802, includes two inlets/outlets 806, 808, and a plurality of holes 804 configured to receive misting heads. Preferred embodiments use threaded MSBL300 Mini-Jets from dripworks.com, which provide a near 180-degree spray pattern and, at pressures above 30 PSI, the spray becomes more mist-like. In preferred embodiments, pressures of 40 psi and greater are used.

Figure 9:
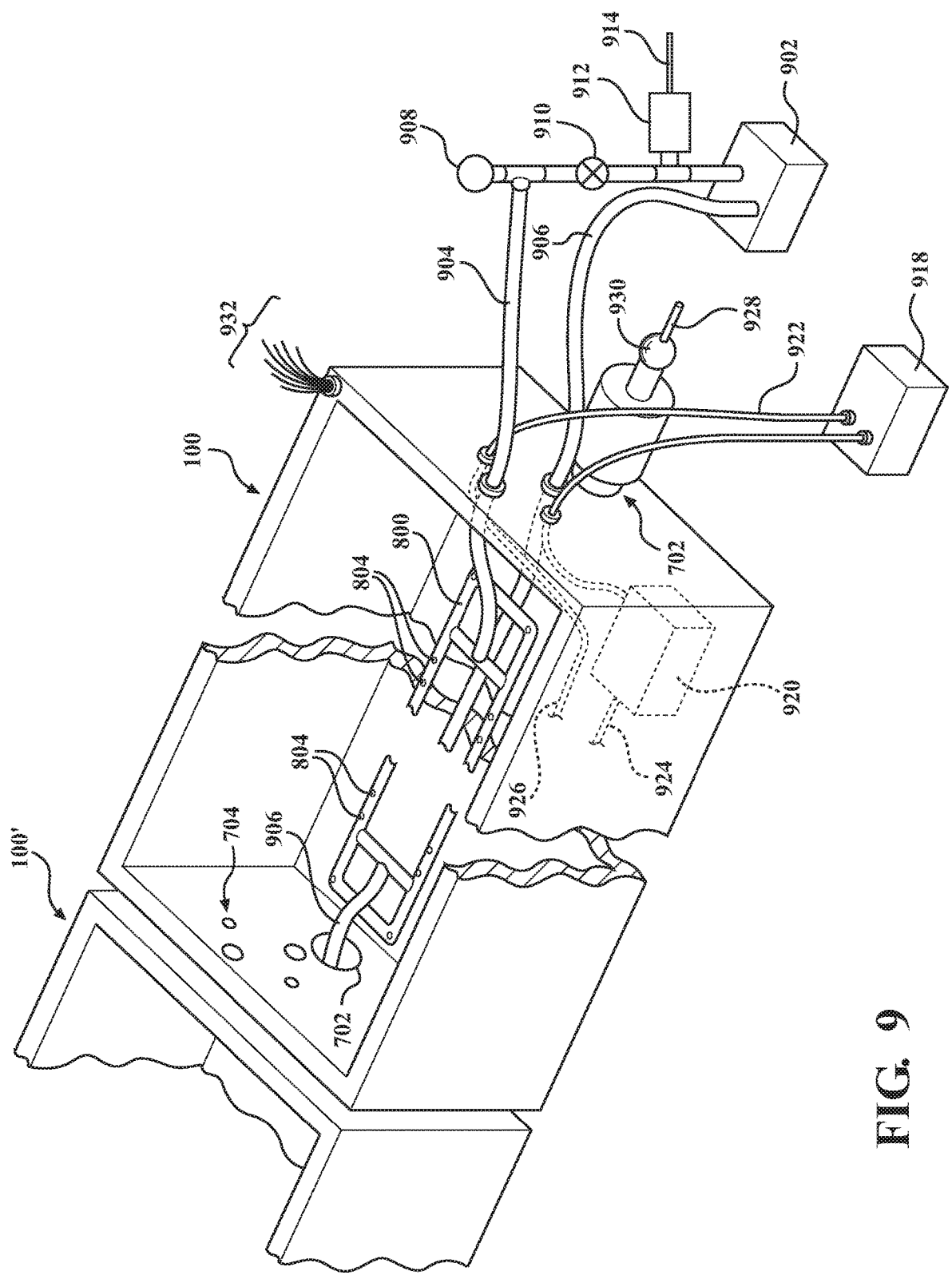
FIG. 9 illustrates plumbing components associated with a typical installation.

FIG. 9 is a schematic diagram that illustrates a typical plumbing arrangement. A jet pump 902 pressurizes line 904 connected to spray manifold 800. The output of the manifold may exit at the other end of tray 100. Rather than utilize ports 704, output line 906 may be threaded through port 702 into the next tray 100'. Fluid is drawn into pump 902 through line 906 which has an open end in tray 100. Clips are preferably provided to hold lines such as 906 under manifold 800 to ensure they are at all times submerged in the reservoir at the bottom of the tray. Lines 904, 906 may be constructed using 1" i.d. reinforced nylon hose. Jet pump 902 may be a ¾ hp jet pump to accommodate a cascade of 3-4 trays. A larger pump may be specified when coupling a larger number of trays.

In operation, pump is activated on a periodic basis depending upon the type of plants being cultivated, the growing stage of the plants, and the style of the gardener. For example, with cannabis plants in their vegetation growth phases, the misters may be operated with a cycle of 30 seconds ON and 10 minutes OFF. In the flowering stage, the cycle may be modified with 30 seconds ON and 5 minutes OFF, for example. Again, these figures are merely representative and the invention is certainly not limited in this regard.

Various plumbing components may be installed between pump 902 and pressurized line 904, which may be a ¾" i.d. reinforced nylon hose. The additional plumbing components may include a 1-100 psi pressure gauge 908; 1" shut-off valve 910; and filter 912 coupled to drain line 914. Filter 912 may be a 200-mesh filter, also available from dripworks.com. Filter 912 works to keep particulates out of the plumbing network which might otherwise clog spray heads, for example. The system may be drained, and filter 912 exchanged on a regular basis, every week or two, for example.

Continuing the reference to FIG. 9, a typical set-up further includes a chiller 918 which cools the water in the reservoir using submersible fountain pump 920. The chiller communicates with the pump 920 and tray 100 through ½" diameter hoses 922. The output line 924 of pump 920, as well as the input line 926 to chiller 918 are both open-ended within the table 100. As with line 906, lines 924, 926 may also be clipped under manifold 800 to ensure they remain submerged below reservoir level. Chiller 918 cools the reservoir to a preferred temperature in the range of 55-65 for a variety of reasons. First, temperatures in this range simulate ground temperature associated with natural growing conditions. Perhaps more importantly, the lower temps control the spread of pythium and other unwanted parasites. Chilling is further desirable when tables are located in warm room, as would be the case in a greenhouse.

FIG. 9 also shows a reducing fitting connected to port 702 which in turn is connected to fluid input line 928 through float valve 930. While optional, this arrangement enables the reservoir(s) in each table to be topped off to maintain the reservoir at a desired level if/when the water levels is reduced due to evaporation or other factors. A rubber stopper port may be provided as a pass-through for cables 932 to fountain pump 920 and cords associated with solution sensors to monitor characteristics such as pH. Two pH pumps may be used, including a first unit to increase pH and a second unit to lower it and maintain pH level in the range of 6.5 to 6+. The nutrients in the reservoir solution may contain any lab formulation of N, P and K depending upon the plant species being cultivated, growing stage, etc.

Any or all aspects of table operation and/or maintenance may be automated though appropriate computer software control. Such aspects may include, without limitation, misting cycles, nutrient balance, pH control, period flushing, and so forth. One or more feedback loops may be established to monitor some or all of the above conditions and modify growing parameters and/or add or subtract materials to automatically maintain target growth conditions.

The invention claimed is:

1. A hybrid aeroponic/hydroponic growing system, comprising:
an elongated growing table having opposing sidewalls defining a width, two opposing end walls defining a length, a lower portion with a closed, flat bottom, and an upper portion with an open top;
wherein at least the lower portion of the table is sealed against the sidewalls and end walls, thereby forming a water-tight interior to maintain a reservoir of nutrient solution;
wherein the upper portion of the table is configured to receive a plurality of removable and reconfigurable panels, at least including panels with spaced-apart apertures, each adapted to support a growing plant having a leafy portion disposed above the panel and a root portion disposed below the panel;
wherein the reservoir of nutrient solution fills the entire lower portion of the elongated growing table, including regions of the lower portion directly below the perforations in the removable and reconfigurable panels;
a spray manifold configured for longitudinal placement along a central region of the interior of the table, the manifold having an inlet adapted to receive pressurized nutrient solution;
one or more removable and replaceable baffle plates adapted for placement in the interior of the table;
a structure within the interior of the table configured to support the baffle plates above the nutrient solution in the closed bottom of the table so as to create a cavity between the baffle plates and the removable and reconfigurable panels;
wherein the spray manifold further includes an upper portion with a plurality of apertures configured to receive spray heads, and wherein the spray heads have sufficient pressure to create a mist of the nutrient solution within the cavity above the baffle plates; and
wherein the system facilitates aeroponic plant culture as the roots in the cavity are misted with the nutrient solution until they intrude into the reservoir, and a combined aeroponic and hydroponic plant culture once the roots of the plants to enter into the nutrient solution.

2. The system of claim 1, including a pair of ports, each being associated with a respective one of the end walls of the table, and wherein the ports enable a plurality of the tables to be serially cascaded and share a common reservoir.

3. The system of claim 1, wherein the length of the growing table is in the range of 3 to 10 feet.

4. The system of claim 1, wherein the length of the growing table is in the range of 3 to 5 feet.

5. The system of claim 1, wherein the length of the growing table is in the range of 7 to 10 feet.

6. The system of claim 1, wherein the removable and reconfigurable panels configured to cover the open top of the table include panels with small perforations to receive plant clones or cuttings, and panels with large perforations to receive established plants in net cups or pots.

7. The system of claim 6, wherein the upper portion of the table is configured to receive three elongated rows of the removable and reconfigurable panels.

8. The system of claim 6, wherein the upper portion of the table is configured to receive three elongated rows of the removable and reconfigurable panels, including a middle row with non-perforated panels and two outside rows with perforated panels.

9. The system of claim 1, wherein the table includes openings to receive conduits to and from a chiller to cool the nutrient solution.

10. The system of claim 1, wherein the spray manifold includes an outlet facilitating connection to a spray manifold in an adjoining table.

11. The system of claim 1, wherein the spray heads deliver the nutrient solution in mist form at a pressure above 30 psi.

12. The system of claim 1, wherein the spray heads deliver the nutrient solution in mist form at a pressure above 40 psi.

13. A hybrid aeroponic/hydroponic growing system, comprising:
- an elongated growing table having opposing sidewalls defining a width, two opposing end walls defining a length, a lower portion with a closed, flat bottom, and an upper portion with an open top;
- wherein at least the lower portion of the table is sealed against the sidewalls and end walls, thereby forming a water-tight interior to maintain a reservoir of nutrient solution;
- wherein the upper portion of the table is configured to receive a plurality of removable and reconfigurable panels, each panel having a plurality of spaced-apart apertures adapted to receive a growing plant having a leafy portion disposed above the panel and a root portion disposed below the panel;
- wherein the reservoir of nutrient solution fills the entire lower portion of the elongated growing table, including regions of the lower portion directly below the perforations in the removable and reconfigurable panels;
- a spray manifold configured for longitudinal placement along a central region of the interior of the table, the manifold having an inlet adapted to receive pressurized nutrient solution;
- one or more removable and replaceable baffle plates adapted for placement in the interior of the table;
- a structure within the interior of the table configured to support the baffle plates above the nutrient solution in the closed bottom of the table so as to create a cavity between the baffle plates and the removable and reconfigurable panels;
- wherein the system facilitates aeroponic plant culture as the roots in the cavity are misted with the nutrient solution until they intrude into the reservoir, and a combined aeroponic and hydroponic plant culture once the roots of the plants to enter into the nutrient solution; and
- further including a pair of ports, each being associated with a respective one of the end walls of the table, enabling a plurality of the tables to be serially cascaded and share a common reservoir.

14. The system of claim 13, wherein the length of the growing table is in the range of 3 to 10 feet.

15. The system of claim 13, wherein the length of the growing table is in the range of 3 to 5 feet.

16. The system of claim 13, wherein the length of the growing table is in the range of 7 to 10 feet.

17. The system of claim 13, wherein the upper portion of the table is configured to receive three elongated rows of removable and reconfigurable panels configured to cover the open top of the table.

18. The system of claim 13, wherein the upper portion of the table is configured to receive three elongated rows of removable and reconfigurable panels configured to cover the open top of the table, including a middle row with non-perforated panels and two outside rows with perforated panels.

19. The system of claim 13, wherein the table includes openings to receive conduits to and from a chiller to cool the nutrient solution.

20. The system of claim 13, wherein the spray manifold includes an outlet facilitating connection to a spray manifold in an adjoining table.

21. The system of claim 13, wherein the spray heads deliver the nutrient solution in mist form at a pressure above 30 psi.

22. The system of claim 13, wherein the spray heads deliver the nutrient solution in mist form at a pressure above 40 psi.

* * * * *